(12) United States Patent
Akirav et al.

(10) Patent No.: US 8,719,234 B2
(45) Date of Patent: May 6, 2014

(54) HANDLING REWRITES IN DEDUPLICATION SYSTEMS USING DATA PARSERS

(75) Inventors: Shay Haim Akirav, Tel Aviv (IL); Aviv Caro, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 13/358,159

(22) Filed: Jan. 25, 2012

(65) Prior Publication Data

US 2013/0191349 A1 Jul. 25, 2013

(51) Int. Cl.
*G06F 17/00* (2006.01)
(52) U.S. Cl.
CPC .................................... *G06F 17/00* (2013.01)
USPC .......................................................... 707/692
(58) Field of Classification Search
USPC .......... 707/609, 692, 696, 741–746; 711/161, 711/162
See application file for complete search history.

(56) References Cited

U.S. PATENT DOCUMENTS

| 8,051,050 | B2* | 11/2011 | Popovski et al. ............. 707/692 |
| 8,078,593 | B1* | 12/2011 | Ramarao ....................... 707/692 |
| 8,370,315 | B1* | 2/2013 | Efstathopoulos et al. ..... 707/696 |
| 2009/0049260 | A1 | 2/2009 | Upadhyayula |
| 2009/0171888 | A1 | 7/2009 | Anglin |
| 2009/0271454 | A1* | 10/2009 | Anglin et al. ................. 707/204 |
| 2010/0077161 | A1 | 3/2010 | Stoakes et al. |
| 2010/0199065 | A1 | 8/2010 | Kaneda |
| 2011/0040728 | A1* | 2/2011 | Akirav et al. ................. 707/634 |
| 2013/0060739 | A1* | 3/2013 | Kalach et al. ................. 707/692 |
| 2013/0232119 | A1* | 9/2013 | Aronovich et al. ........... 707/653 |
| 2013/0232125 | A1* | 9/2013 | Huang et al. .................. 707/692 |

OTHER PUBLICATIONS

Chuanyi Liu et al., Semantic Data De-duplication for archival storage systems, 2008, IEEE, 1-9.*

* cited by examiner

*Primary Examiner* — Jean B Fleurantin
(74) *Attorney, Agent, or Firm* — Griffiths & Seaton PLLC (57) ABSTRACT

Methods, computer systems, and computer program products for deduplicating data are provided. Data is parsed to identify portions of metadata within the data. The data and identified portions of metadata are processed by a deduplication engine to be storable in a single repository. The deduplication engine is adapted for deduplicating the data without at least one of deduplicating and indexing the identified portions of metadata.

24 Claims, 6 Drawing Sheets

FIG. 6

HANDLING REWRITES IN DEDUPLICATION SYSTEMS USING DATA PARSERS

BACKGROUND OF THE INVENTION

1. Field of the Invention

The present invention relates in general to computers, and more particularly to methods, computer systems, and computer program products for handling rewrites using parsers in a deduplication system.

2. Description of the Related Art

Data deduplication refers to the reduction and/or elimination of redundant data. In a data deduplication process, duplicate copies of data are reduced or eliminated, leaving a minimal amount of redundant copies, or a single copy of the data, respectively. Using deduplication processes provides a variety of benefits, such as reduction of required storage capacity and reduced need for network bandwidth. Due to these and other benefits, deduplication has emerged in recent years as a highly important technological field in computing storage systems. Challenges to providing deduplication functionality include aspects such as efficiently finding duplicated data patterns in typically large storage repositories, and storing the data patterns in a deduplicated storage-efficient form. One particular challenge relates to deduplication of non-sequentially written data.

SUMMARY OF THE DESCRIBED EMBODIMENTS

To address the particular challenge described previously, methods, computer systems, and computer program products embodiments for deduplicating data using data parsers are provided. Data is parsed to identify portions of metadata within the data. The data and identified portions of metadata are processed by a deduplication engine to be storable in a single repository. The deduplication engine is adapted for deduplicating the data without at least one of deduplicating and indexing the identified portions of metadata. Other related embodiments are disclosed and provide related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Data deduplication is emerging in recent years as a highly important and vibrant field in storage systems. The goal is to store a single copy of duplicated data, and the challenges in achieving this goal are efficiently finding the duplicated data patterns in a typically large repository, and storing the data patterns in a deduplicated storage efficient form.

Deduplication systems may externalize various logical data storage entities, such as files, data objects, backup images, data snapshots or virtual tape cartridges. The known deduplication algorithms function better when sequential user data streams are incoming into the systems. Such data streams are mainly a result of backup or archive activity. Eventually data streams are stored in the system as Internal DeDuplicated Files (IDDF) or sequences of blocks.

Some backup applications (or archiving tools) add metadata to the user data stream while performing the backup. This process breaks the sequence of the user's data and has potentially negative effects on the deduplication algorithm. In order to overcome that obstacle, deduplication systems use data parsers that try to identify metadata added by applications and write them internally in a separate stream or find other ways to ignore the metadata. In this manner, the deduplication algorithms continue to operate using sequential data.

The core of each deduplication system is the deduplication index. The deduplication index maps the results of mathematical calculations performed on data segments to the area in the deduplication system in which the data segment exist (positions inside IDDFs). Thus, when new data segments are coming to the system, the mathematical calculations are performed, and if the calculated values of the new data match old values that exist in the system, the new segments are potentially identical to the one already existing in the system. The decision where data segments start and where they end may be based on a number of factors. In one embodiment, a simple methodology bases such a decision on fixed-size segments. For example, each 256K aligned address starts a 256K size segment, which is considered a basic working unit.

The illustrated embodiments provide an example with fixed size segments, however, in another embodiment, blocks that are not in fixed size may be implemented, as one of ordinary skill in the art will appreciate. Some deduplication algorithms are based on splitting streams to segments based on the data streams, but in both cases it is important to split to segments in the desired position.

It is common today that backup applications use File System Interface (FSI) protocols with Network Attached Storage (NAS) architectures, usually NFS or CIFS. NAS protocols are not sequential by nature, but since backup applications write mostly sequentially, file system interface can also be used with deduplication systems. In spite of the use of NAS protocols, not all data necessarily arrives sequentially. There are various factors for this phenomenon. For example, NAS protocols do not guarantee that the data will be sent at the same order that data segments were written; accordingly any server may implement its own optimization algorithms that will change the order occasionally.

Although backup applications usually write sequentially, in some cases they do not write sequentially all data segments. This may be a challenge for deduplication systems. This challenge may be partially solved by accumulating data in the deduplication cache memory. However, in some cases it is not enough because the backup application may decide to write again some sequences (at any size) that were already written, thus necessitating replacement of data sequences that were already written in the system. If a rewritten sequence is previously identified as user data, and after rewriting is identified as metadata, and the deduplication index keeps only aligned sequential segments of user data, then the deduplication index cannot handle the replacement without reading the whole IDDF and repeating all of the mathematical calculations.

Consider the following example. A 256K aligned deduplication index is implemented, and an extreme case is presented of a stream identified completely as user data (i.e., not metadata). Thus, the first segment retains values related to addresses 0 to 256K of the stream, and the second segment retains values related to addresses 256K to 512K, etc., etc. Next assume a write occurs, and only 20 bytes are changed at an address 300K. The write is identified as metadata. Accordingly, the mathematical calculations of the second segment (again, 256K-512K) are not valid anymore. However, if the segments should include only user data, then the borders of the segments of the entire IDDF should be shifted to lower addresses by 20 bytes. Accordingly, all mathematical calculations from the second segment until the end of the file should be repeated, which will incur resource usage and potentially slow performance.

One mechanism to avoid the foregoing challenge is to utilize a small deduplication segment size and avoid parsing the data streams. Thus, if metadata is identified and cannot be deduplicated, only a small portion of the user data is affected (only the data in the same block). However, using small segment sizes in this regard requires the maintenance of large indexes in potentially costly storage, and may incur its own performance penalties.

The illustrated embodiments present solutions to the challenges previously described by retaining metadata in the deduplication index, but performing mathematical deduplication calculations solely on user (non-metadata) data. For the mathematical calculations, two data sequences may be considered sequential if there is one metadata sequence between the two data sequences. Indexed data segments are kept aligned despite the fact that areas of data may be rewritten (e.g., updated) with metadata. In this way, the deduplication index is aware of the metadata areas that are not deduplicated in order to support data segment re-writes using parsers. These solutions and various methodologies towards accomplishing this functionality are described herein in the following paragraphs.

Figure 1:
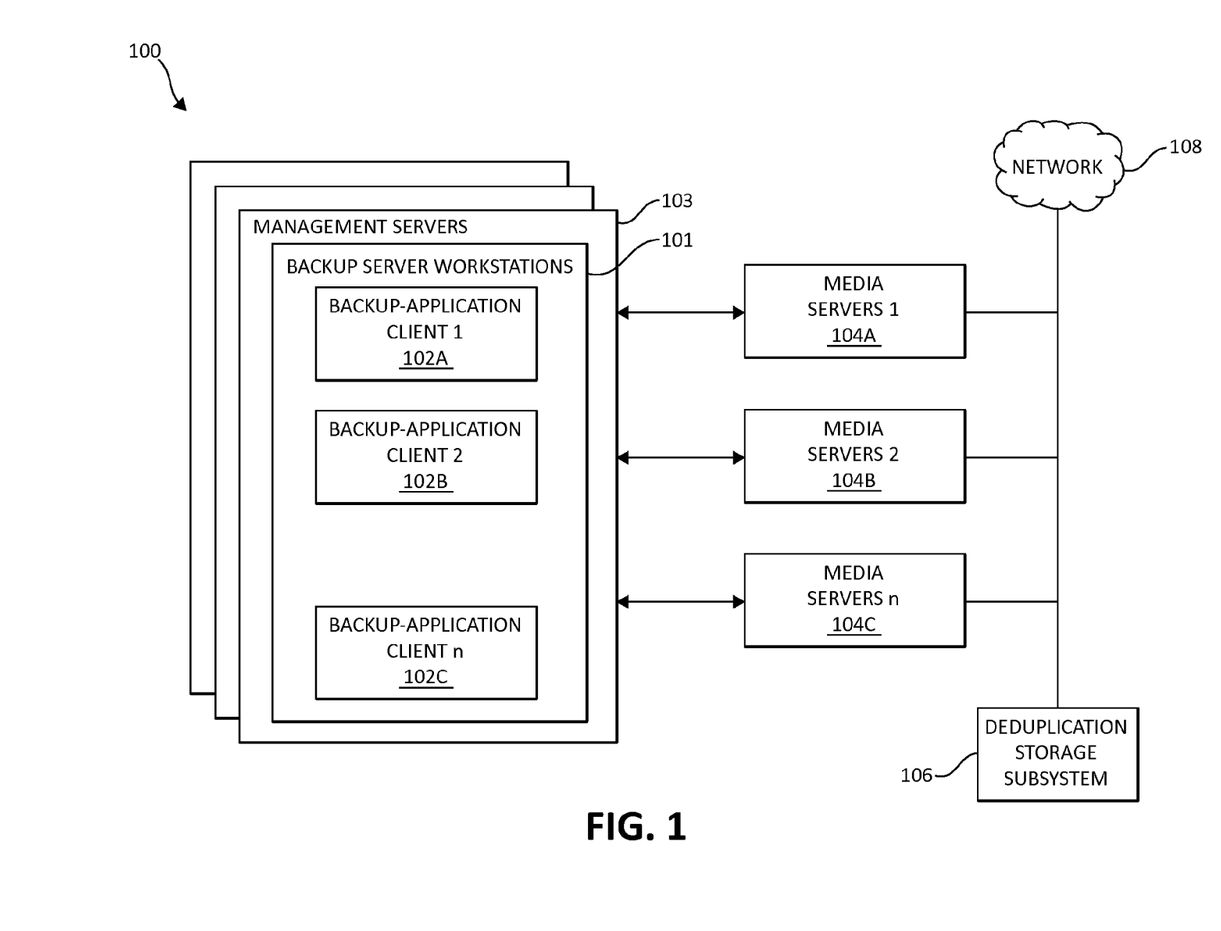
FIG. 1 illustrates an exemplary computing environment in which aspects of the present invention may be implemented.

As an initial matter, FIG. 1 illustrates an exemplary computing storage environment 100 in which aspects of the present invention may be implemented. The architecture provides storage services to management servers 103 each containing backup server workstations 101. The management servers 103 manage the backup operations and polices. Included in the backup server workstations 101 are a number of backup-applications clients 102 that are backed up, shown in the figures as Backup-application client 1 (102A), 2 (102B), 3 (102C). Connected to both a network 108, are several media servers 104 (shown in the figures as Media Servers 104A, 104B, and 104C). A Deduplicated data subsystem 106 is provided between various media servers 104 and the network 108. Deduplication data subsystem 106 is interconnected via networking components, which provides internetwork connectivity between the components of the architecture. The network 108 may, in one embodiment, include a wide area network (WAN). In other embodiments, the network 108 may include local area networks (LANs), storage area networks (SANs), and other network topologies known to the skilled artisan. The media servers 104 channel data between the backup-application clients and the deduplication storage subsystem 106. The deduplication storage subsystem 106 receives data (write operations) via the network 108.

Figure 2:
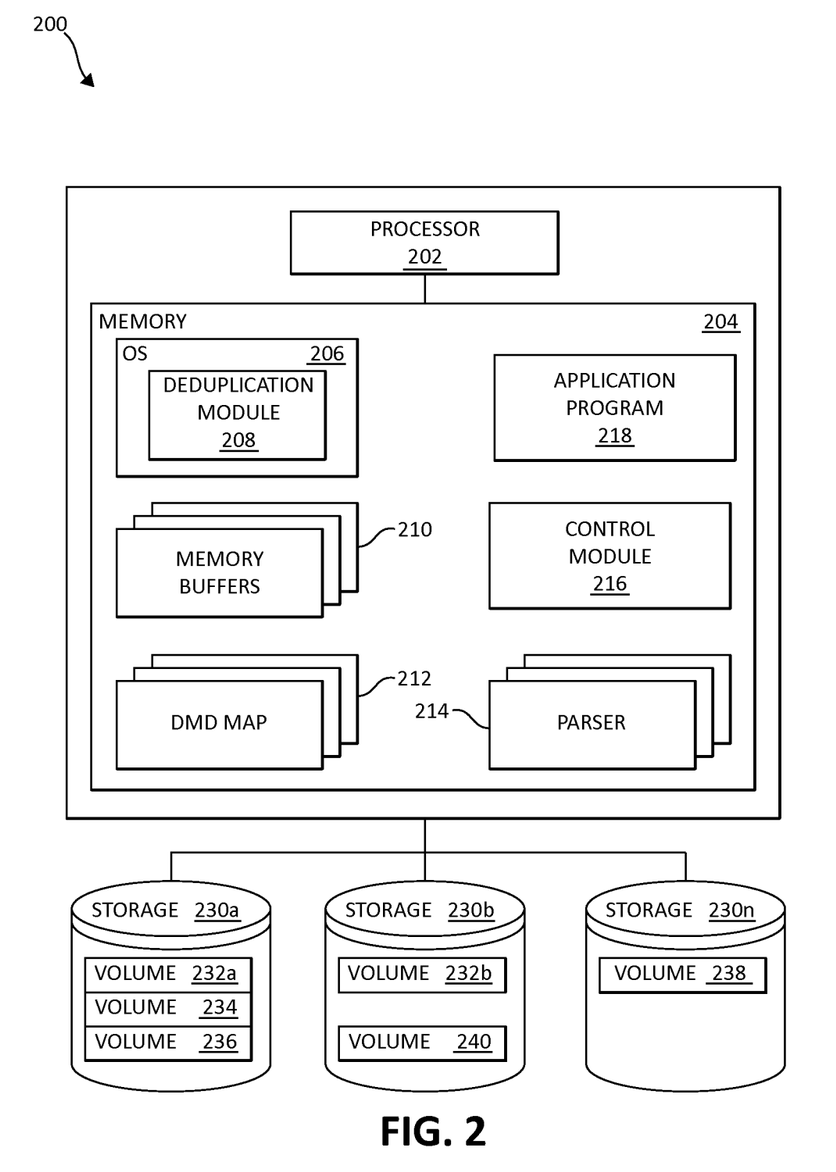
FIG. 2 illustrates an exemplary portion of a deduplication subsystem as illustrated in FIG. 1, previously, including a processor device.

Turning now to FIG. 2, an exemplary portion 200 of a deduplication storage subsystem 106 as also seen in FIG. 1, previously, is illustrated. The portion 200 of the deduplication storage subsystem 106 is operable in a computer environment as a portion thereof, in which mechanisms of the illustrated embodiments may be implemented. It should be appreciated, however, that FIG. 2 is only exemplary and is not intended to state or imply any limitation as to the particular architectures in which the exemplary aspects of the various embodiments may be implemented. Many modifications to the architecture depicted in FIG. 2 may be made without departing from the scope and spirit of the following description and claimed subject matter.

The portion 200 includes a processor 202 and a memory 204, such as random access memory (RAM). In the illustrated embodiment, the portion 200 operates under control of an operating system (OS) 206 (e.g. z/OS, OS/2, LINUX, UNIX, WINDOWS, MAC OS) stored in memory 204, and interfaces with the user to accept inputs and commands and to present results.

The portion 200 implements an application program 218 written in a programming language such as COBOL, PL/1, C, C++, JAVA, ADA, BASIC, VISUAL BASIC or any other programming language to be translated into code that is readable by the processor 202. After completion, the application program 218 accesses and may manipulate data stored in the memory 204 of the deduplication storage subsystem 106.

To further implement and execute mechanisms and processes according to the present invention, OS 206, in conjunction with the memory 204, the processor 202, the application program 218, and other computer processing, networking, and storage components, may implement memory buffers 210 in order to receive a new write operation from the client for storing the data, a data/metadata (DMD) map 212 to assist in the mechanisms of the illustrated embodiments as will be further described, a parser 214 to assist in parsing through data to identify user data and metadata, and a control module 216 to, for example, manage each of the write operations received from a client. DMD map 212 may be incorporated as part of a larger deduplication index, as one of ordinary skill in the art will appreciate.

In one embodiment, instructions implementing the operating system 206, the application program 204, a deduplication module 208, and the control module 216, as well as the DMD map 212 and parser 214 are tangibly embodied in a computer-readable medium, which may include one or more fixed or removable data storage devices, such as a zip drive, disk, hard drive, DVD/CD-ROM, digital tape, SSDs, etc. Further, the operating system 206 and the application program 218 comprise instructions (e.g., in executable portions) which, when read and executed by the deduplication storage subsystem 106, cause the deduplication storage subsystem 106 to perform the steps necessary to implement and/or use the present invention. The application program 218 and/or the operating system 206 instructions may also be tangibly embodied in the memory 204 and/or transmitted through or accessed by network 108 (FIG. 1) via various components. As such, the terms "article of manufacture," "program storage device" and "computer program product" as may be used herein are intended to encompass a computer program accessible and/or operable from any computer readable device or media.

The deduplication module 208, assists, for example, in managing the receiving the plurality of write operations for deduplication storage of the data from a network attached storage (NAS) system. The deduplication module may 208, in one embodiment, be adapted for performing deduplication calculations on user data according to the mechanisms of the illustrated embodiments.

Storage 230 (includes all storage components shown in the figure as 230A, 230B, and 230n) may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

As shown in FIG. 2, a logical volume, or simply "volume," may have different kinds of allocations. Storage 230A is shown configured with two entire volumes, 234 and 236 and a partial volume 232A. Storage 230B is shown with another partial volume 232b and an entire volume 240. Storage 230n is shown as being fully allocated to volume 238. From the above examples, it will be appreciated that the storage 230 may be configured to include one or more partial and/or entire volumes. Volumes may further be divided into so-called "tracks," which represent a fixed block of storage. A track is therefore associated with a given volume.

As previously mentioned, the illustrated embodiments provide solutions to the deduplication challenges previously described by retaining in the deduplication index information on the complete incoming data stream (i.e., and not only on the data parts), while performing the mathematical deduplication calculations solely on the user data (i.e., not the metadata).

In one embodiment, to accomplish these solutions, the following steps may be performed by various components as previously described in FIG. 1 and FIG. 2. In a first step, a data parser scans the data and identifies metadata segments. The result is stored in the DMD map 212 (FIG. 2) previously described. DMD map 212 may be represented, in one embodiment, by describing solely the memory address ranges of the data. In a following step, the deduplication module 208 performs mathematical deduplication calculations solely on the user data. If a particular data segment matches existing data that is already part of the repository, a software module (such as control module 216), may be notified and the overall deduplication index may then be updated with information reflecting that another copy of the same data is part of the repository. Alternatively, if the particular data segment is new, the segment may then be written to disk/file (or to whatever storage entity retains the data in the system), again through the control module 216 or another component of the deduplication system. The deduplication index then may record the ranges of addresses that are relevant for the deduplication calculations. In other words, the deduplication index retains the portion of the DMD map relevant for each particular segment. Thus, a comparison with future data is made available for later incoming data streams.

In a later step, if the data segment is changed (for example, an area of the data segment in the middle of a file is updated), the parser scans and identifies the change, and creates a DMD map. The deduplication module 208 then receives the DMD map for the new data. If the written data includes only part of the segment, then the data portion that was not changed should be read from storage. In this case, there is no need to read the metadata portion(s) due to no mathematical deduplication calculations to be performed on that portion. In a still later step, a new mathematical calculation is performed for the new segment that includes the changed portion and the existing portion that was unchanged.

Figure 3:
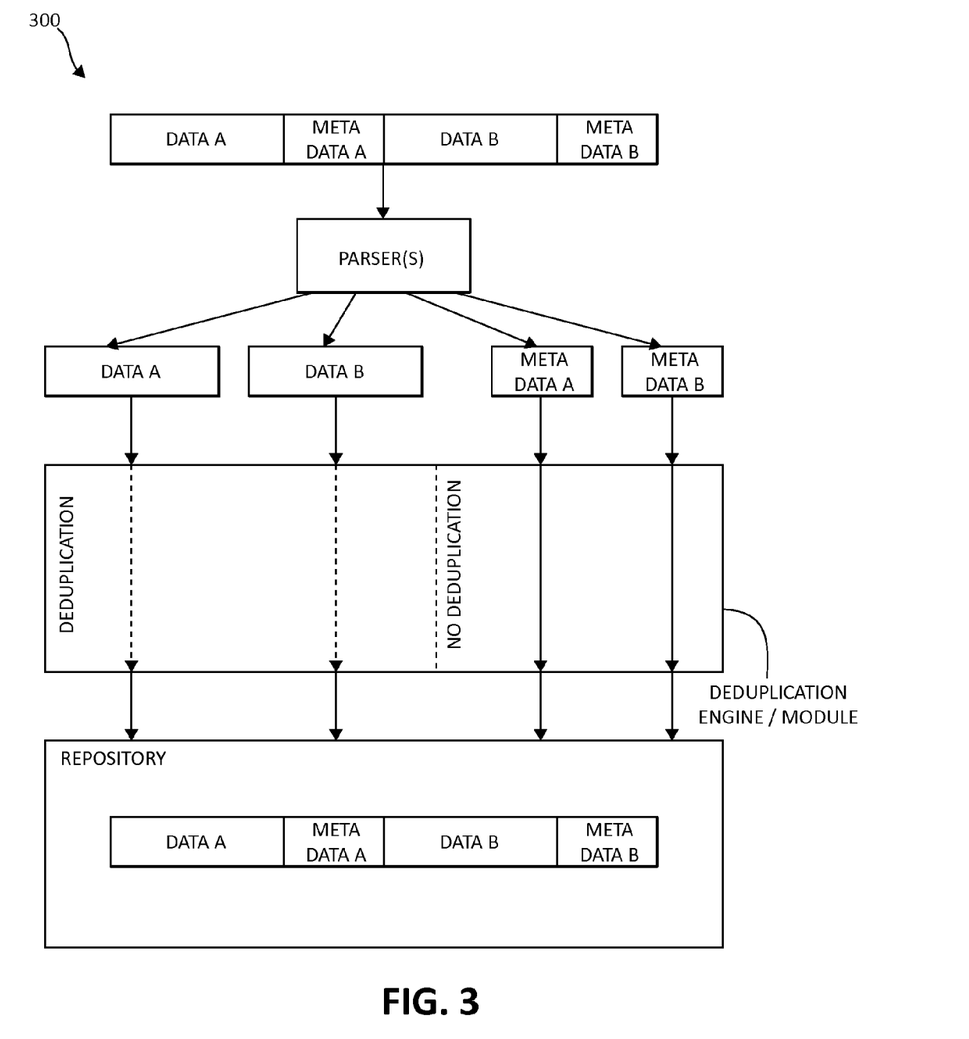
FIG. 3 is a block diagram illustrating an exemplary flow of data according to aspects of the illustrated embodiments.

Turning now to FIG. 3, a block diagram of a data process 300 illustrating the exemplary processes just described, is depicted. A data segment including data segments A and B and metadata A and B is parsed. The whole data segment (including the metadata) is processed through the deduplication module as a common file ordered list of segments, however the user data portion receives the mathematical deduplication calculations, whereas the metadata portions do not. The deduplicated data and metadata is then processed to the data repository, where it is stored as shown.

Figure 4:
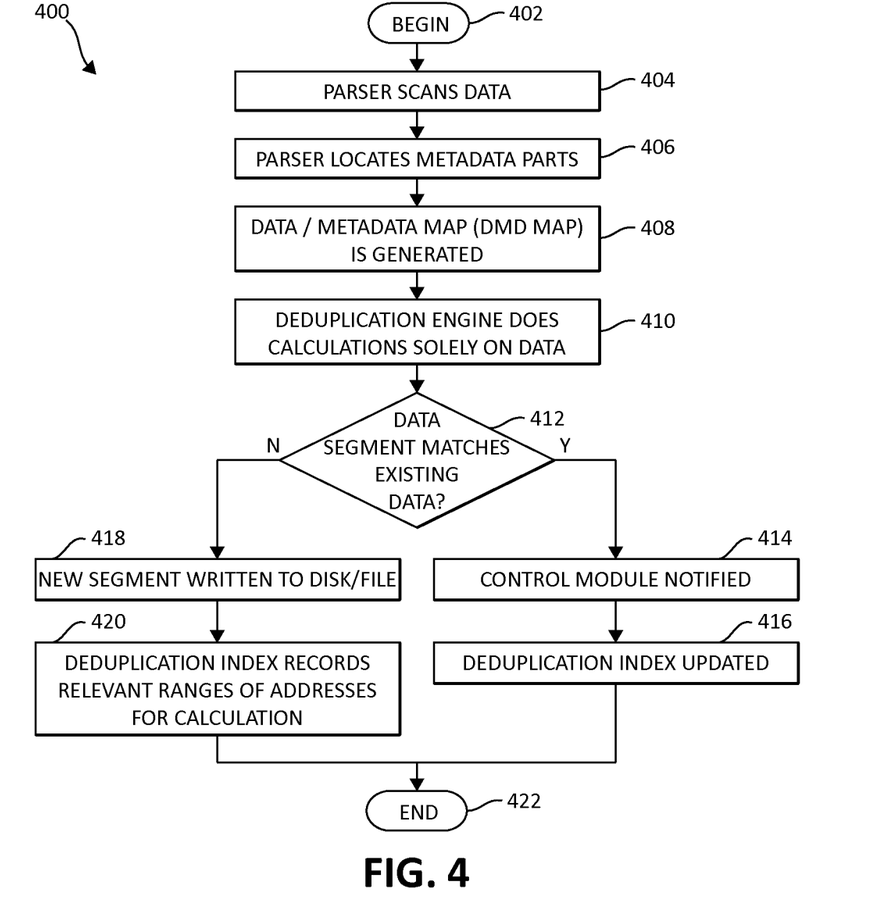
FIG. 4 is a flow diagram of an exemplary method for processing data in a deduplication system using data parsers, according to one aspect of the present invention.

FIG. 4, following, illustrates an exemplary process for processing data using parsers, according to the mechanisms of the present invention, and in view of the previous description. Method 400 begins (step 402) with the parser scanning an incoming data stream (step 404), and identifying metadata parts (step 406), which locations are used to build a DMD map (step 408). Subsequently, the deduplication module/engine performs mathematical deduplication calculations solely on the user data (step 410). For the mathematical calculations, two data sequences may be considered sequential if there is one metadata sequence between the two data sequences.

If the data segment matches existing data (step 412), then the control module is notified (step 414) and the deduplication index updated (step 416) as previously described. Alternatively, if the data segment is new, the new data segment is written (step 418), and the deduplication index records the relevant ranges of addresses for the deduplication calculations (again, noting those ranges that will not need to be calculated as they contain metadata) (step 420). Indexed data segments are kept aligned despite the fact that areas of data may be re-written (e.g., updated) with metadata. The method 400 ends (step 422).

The method of FIG. 4 illustrates processing (e.g., writing) data using parsers to an area in a file (or any logical entity) for a first time. However, a re-write of the data segment in an area of a file (or any logical entity) may occur, but not necessarily immediately after the first write operation. A time difference may exist between the first write and a re-write operation. Accordingly, FIG. 5, following, illustrates an exemplary process for processing rewrites of data using parsers, according to the mechanisms of the present invention, and in view of the previous description.

Figure 5:
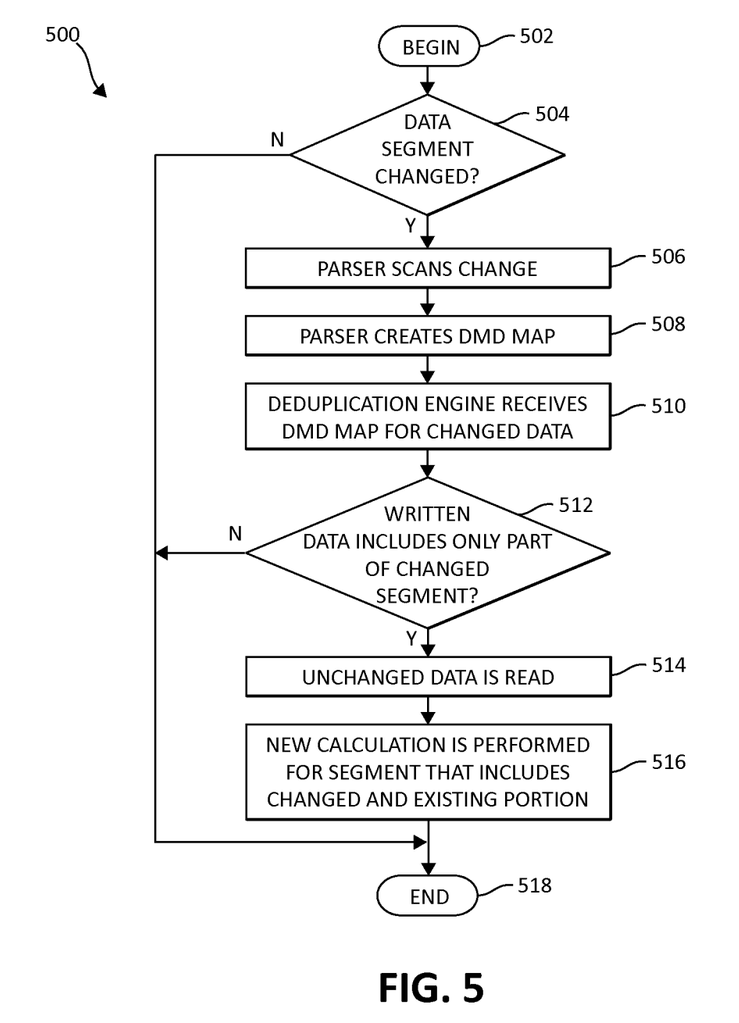
FIG. 5 is a flow diagram of an exemplary method for processing rewrites in a deduplication system using data parsers, according to one aspect of the present invention.

Method 500 begins (step 502). If the data segment is then later changed (step 504), the parser scans the change (step 506), and again creates a DMD map based on the ranges of data/metadata (step 508), which is then provided to the deduplication module/engine (step 510). If the written data includes only part of a changed segment (step 512), the unchanged data is read, and new mathematical deduplication calculations are performed for the segment that includes the changed and existing portion (steps 514, 516). For the mathematical calculations, two data sequences may be considered sequential if there is one metadata sequence between the two data sequences. Otherwise, the method 500 ends (step 518). Returning to step 504, if the data segment does not change, the method 500 again ends (again, step 518).

Figure 6:
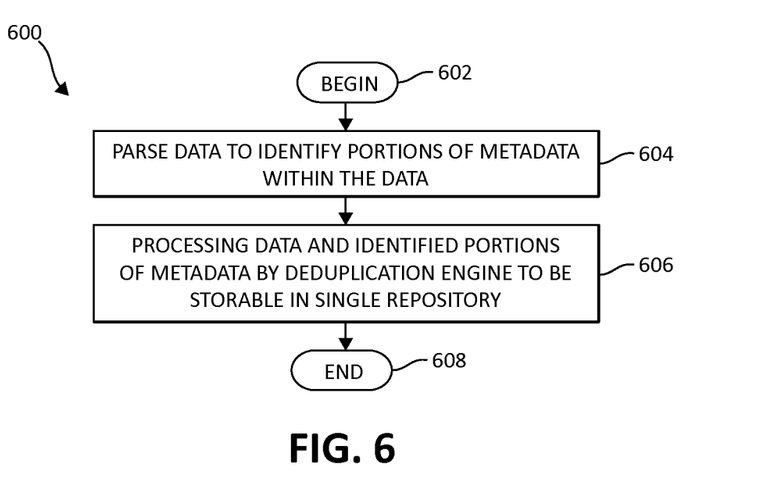
FIG. 6 is a flow diagram of an additional exemplary method for processing data in a deduplication system using data parsers, again according to one aspect of the present invention.

FIG. 6, following, illustrates an additional method for processing data using parsers according to the illustrated embodiments. Method 600 begins (step 602) by parsing data to identify portions of metadata within the data of an incoming data stream (step 604). The data and identified portions of metadata are processed by the deduplication engine to be storable in a single repository (step 606). The method 600 then ends (step 608).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for deduplicating data by a processor, comprising:
    parsing the data to identify portions of metadata within the data; and
    processing the data and identified portions of metadata by a deduplication engine to be storable in a single repository, the deduplication engine adapted for deduplicating the data without at least one of deduplicating and indexing the identified portions of metadata, wherein:
        if a segment of the data matches existing data, notifying a data manager module of the match, and performing the indexing on the data segment by updating a deduplication index, and
        if the data segment is identified as new, writing the new segment to disk, and recording at least one of a range of addresses relevant to the new data segment.

2. The method of claim 1, wherein if a segment of the data is subsequently updated, only data of the segment, without identified portions of metadata, is subsequently deduplicated.

3. The method of claim 2, further including parsing the updated data segment to identify additional portions of metadata within the updated data segment.

4. The method of claim 1, further including, pursuant to parsing the data, generating a Data/Metadata (DMD) map.

5. The method of claim 4, further including providing the DMD map to the deduplication engine.

6. The method of claim 5, further including pursuant to the parsing the updated data segment, generating a Data/Metadata (DMD) map for the updated data segment.

7. The method of claim 6, wherein the DMD map for the updated data segment is provided to the deduplication engine.

8. The method of claim 1, further including, pursuant the parsing the data to identify portions of metadata within the data, performing the following:
performing deduplication calculations solely on user data, and
maintaining the alignment of a segment of the data in a deduplication index.

9. A system for deduplicating data, comprising:
at least one processor adapted for parsing the data to identify portions of metadata within the data; and
a deduplication engine, operable by the at least one processor, wherein the deduplication engine is adapted for:
processing the data and identified portions of metadata to be storable in a single repository, and
deduplicating the data without at least one of deduplicating and indexing the identified portions of metadata, wherein:
if a segment of the data matches existing data, notifying a data manager module of the match, and performing the indexing on the data segment by updating a deduplication index, and
if the data segment is identified as new, writing the new segment to disk, and recording at least one of a range of addresses relevant to the new data segment.

10. The system of claim 9, wherein if a segment of the data is subsequently updated, only data of the segment, without identified portions of metadata, is subsequently deduplicated.

11. The system of claim 9, wherein the at least one processor is further adapted for, pursuant to parsing the data, generating a Data/Metadata (DMD) map.

12. The system of claim 11, wherein the at least one processor is further adapted for parsing the updated data segment to identify additional portions of metadata within the updated data segment.

13. The system of claim 9, wherein the at least one processor is further adapted for providing the DMD map to the deduplication engine.

14. The system of claim 13, wherein the at least one processor is further adapted for, pursuant to the parsing the updated data segment, generating a Data/Metadata (DMD) map for the updated data segment.

15. The system of claim 14, wherein the DMD map for the updated data segment is provided to the deduplication engine.

16. The system of claim 9, wherein the at least one processor is further adapted for, pursuant the parsing the data to identify portions of metadata within the data, performing the following:
performing deduplication calculations solely on user data, and
maintaining the alignment of a segment of the data in a deduplication index.

17. A computer program product for data deduplication in a computing environment by a processor, the computer program product comprising a computer-readable storage medium having computer-readable program code portions stored therein, the computer-readable program code portions comprising:
a first executable portion for parsing the data to identify portions of metadata within the data; and
a second executable portion for processing the data and identified portions of metadata by a deduplication engine to be storable in a single repository, the deduplication engine adapted for deduplicating the data without at least one of deduplicating and indexing the identified portions of metadata, wherein:
if a segment of the data matches existing data, notifying a data manager module of the match, and performing the indexing on the data segment by updating a deduplication index, and
if the data segment is identified as new, writing the new segment to disk, and recording at least one of a range of addresses relevant to the new data segment.

18. The computer program product of claim 17, wherein if a segment of the data is subsequently updated, only data of the segment, without identified portions of metadata, is subsequently deduplicated.

19. The computer program product of claim 18, further including a third executable portion for parsing the updated data segment to identify additional portions of metadata within the updated data segment.

20. The computer program product of claim 17, further including a third executable portion for, pursuant to parsing the data, generating a Data/Metadata (DMD) map.

21. The computer program product of claim 20, further including a fourth executable portion for providing the DMD map to the deduplication engine.

22. The computer program product of claim 21, further including a third executable portion for pursuant to the parsing the updated data segment, generating a Data/Metadata (DMD) map for the updated data segment.

23. The computer program product of claim 22, wherein the DMD map for the updated data segment is provided to the deduplication engine.

24. The computer program product of claim 17, further including a third executable portion for, pursuant the parsing the data to identify portions of metadata within the data, performing the following:
performing deduplication calculations solely on user data, and
maintaining the alignment of a segment of the data in a deduplication index.

* * * * *